United States Patent
Dorman et al.

(10) Patent No.: US 9,825,785 B2
(45) Date of Patent: Nov. 21, 2017

(54) ENHANCED EQUALIZATION BASED ON A COMBINATION OF REDUCED COMPLEXITY MLSE AND LINEAR EQUALIZER FOR HEAVILY ISI-INDUCED SIGNALS

(71) Applicant: MULTIPHY LTD., Ness Ziona (IL)

(72) Inventors: Guy Dorman, Mishmar David (IL); Dan Sadot, Kfar Bilu (IL); Albert Gorshtein, Ashdod (IL)

(73) Assignee: Multiphy Ltd., Ness Ziona (IL)

( * ) Notice: Subject to any disclaimer, the term of this patent is extended or adjusted under 35 U.S.C. 154(b) by 0 days.

(21) Appl. No.: 14/636,040

(22) Filed: Mar. 2, 2015

(65) Prior Publication Data
US 2015/0249557 A1   Sep. 3, 2015

Related U.S. Application Data

(60) Provisional application No. 61/946,960, filed on Mar. 3, 2014.

(51) Int. Cl.
*H04L 25/03*  (2006.01)

(52) U.S. Cl.
CPC .. *H04L 25/03261* (2013.01); *H04L 25/03292* (2013.01)

(58) Field of Classification Search
CPC ... G11B 7/00; H03D 1/00; H03D 1/04; H03H 7/30; H03H 7/40; H03K 5/159;
(Continued)

(56) References Cited

U.S. PATENT DOCUMENTS

| | | | | |
|---|---|---|---|---|
| 6,052,349 A | * | 4/2000 | Okamoto | G11B 20/10009 369/47.26 |
| 6,466,616 B1 | * | 10/2002 | Stenstrom | H04L 25/03254 375/220 |

(Continued)

OTHER PUBLICATIONS

A. Agarwal, "Performance Analysis of Linear and Non-Linear Equalizer in Rician Channel", 2012.*

(Continued)

*Primary Examiner* — Shawkat M Ali
(74) *Attorney, Agent, or Firm* — Fenwick & West LLP

(57) ABSTRACT

A system for digitally equalizing a data channel with heavily ISI-induced signals received after passing a data communication channel using a combination of a linear equalizer and a nonlinear equalizer, which comprises an ADC, for sampling a received signal and converting it to a digital form; a Linear Equalizer for pre-processing said received signal, said Linear Equalizer is adapted to pre-process a first group consisting of echoes/channel taps of the induced ISI, which are not equalized by said nonlinear equalizer, by eliminating the echoes/channel taps of said first group; pre-process a second group consisting of the combination of the entire echoes/channel taps of the induced ISI, by eliminating the echoes/channel taps of said second group; and a nonlinear equalizer for receiving the signals preprocessed by said Linear Equalizer and for further processing said preprocessed signals and eliminating the echoes/channel taps of the induced ISI to be equalized by said nonlinear equalizer, thereby compensating for the entire ISI induced by said channel.

6 Claims, 5 Drawing Sheets

(58) Field of Classification Search
CPC ... H03K 7/30; H03M 13/00; H04B 1/00; H04B 3/23; H04B 7/04; H04B 10/40; H04B 10/61; H04J 14/06; H04L 7/00; H04L 25/03; H04L 25/03076; H04L 25/03261; H04L 27/01; H04L 27/06
USPC ....... 375/219, 229, 232, 233, 234, 316, 341, 375/346; 708/300, 322, 323; 714/794, 714/795
See application file for complete search history.

(56) References Cited

U.S. PATENT DOCUMENTS

| | | | | |
|---|---|---|---|---|
| 6,618,451 | B1* | 9/2003 | Gonikberg | H04L 25/03229 375/229 |
| 6,625,236 | B1* | 9/2003 | Dent | H04L 25/03318 375/341 |
| 6,744,814 | B1* | 6/2004 | Blanksby | H04L 25/03235 375/229 |
| 6,775,322 | B1* | 8/2004 | Zangi | H04L 25/03057 375/232 |
| 6,996,230 | B1* | 2/2006 | Chu | H04B 3/23 370/286 |
| 7,212,569 | B1* | 5/2007 | Clark | H04L 25/022 375/233 |
| 2002/0080898 | A1* | 6/2002 | Agazzi | H03M 1/0624 375/355 |
| 2011/0069749 | A1* | 3/2011 | Forrester | H04L 27/366 375/232 |
| 2012/0002712 | A1* | 1/2012 | Hayami | G11B 20/10009 375/232 |
| 2013/0148711 | A1* | 6/2013 | Abrishamkar | H04L 25/0202 375/232 |
| 2014/0029651 | A1* | 1/2014 | Zhong | H04L 25/03343 375/219 |

OTHER PUBLICATIONS

O. Simeone, "Linear and Nonlinear Preequalization/Equalization for MIMO Systems with Long-Term Channel State Information at the Transmitter", 2004.*

M. Shtaif "The Relation Between Optical Duobinary Modulation and Spectral Efficiency in WDM Systems", Jun. 1999.*

* cited by examiner

ENHANCED EQUALIZATION BASED ON A COMBINATION OF REDUCED COMPLEXITY MLSE AND LINEAR EQUALIZER FOR HEAVILY ISI-INDUCED SIGNALS

FIELD OF THE INVENTION

The present invention relates to the field of communication systems. More particularly, the invention relates to a method and system for providing enhanced equalization of a data channel with heavily ISI-induced signals, based on a combination of reduced complexity MLSE and linear equalizer.

BACKGROUND OF THE INVENTION

Digital modem links with reduced bandwidth include Inter Symbol Interference (ISI), which requires using a Linear Equalizer (LE) to invert the channel and reverse the Inter Symbol Interference (ISI) effect. However, a major drawback of using a Linear Equalizer is the effect of noise enhancement, which occurs due to the channel inversion. An alternative solution is to decode the received signal by using an MLSE (Maximum-Likelihood Sequence Estimation) equalizer (rather than a Linear Equalizer), which is non-linear and therefore, does not enhance the noise at the receiver's input. However, the implementation of an MLSE equalizer is more complex compared to an LE, since it requires longer memory to process many taps backwards.

It is therefore an object of the present invention to provide a method and system for the equalization of a data channel with heavily ISI-induced signals, using a nonlinear equalizer with reduced complexity.

It is another object of the present invention to provide a method and system for the equalization of a data channel with heavily ISI-induced signals, which does not enhance the noise at the receiver's input.

Other objects and advantages of the invention will become apparent as the description proceeds.

SUMMARY OF THE INVENTION

The present invention is directed to a system for digitally equalizing a data channel with heavily ISI-induced signals received after passing a data communication channel using a combination of a linear equalizer and a nonlinear equalizer, which comprises:
  a) an ADC, for sampling a received signal and converting it to a digital form;
  b) a Linear Equalizer for pre-processing the received signal, the Linear Equalizer is adapted to:
    b.1) pre-process a first group consisting of echoes/channel taps of the induced ISI, which are not equalized by the nonlinear equalizer, by eliminating the echoes/channel taps of the first group;
    b.2) pre-process a second group consisting of the combination of the entire echoes/channel taps of the induced ISI, by eliminating the echoes/channel taps of the second group; and
  c) a nonlinear equalizer (such as an RC-MLSE) for receiving the signals preprocessed by the Linear Equalizer and for further processing the preprocessed signals and eliminating the echoes/channel taps of the induced ISI to be equalized by the nonlinear equalizer, thereby compensating for the entire ISI induced by the channel.

The system may further comprise a linear feedback circuitry for continuously adapting the filter taps of the Linear Equalizer, including:
  a) a channel estimation block for receiving the received signal at one input and the decoded symbols from the output of the nonlinear equalizer at the other input, to estimate the channel's impulse response signal;
  b) a FIR block for:
    b.1) receiving a signal which includes the channel taps that are covered by the nonlinear equalizer, from the channel estimation block;
    b.2) receiving the decoded symbols from the output of the nonlinear equalizer;
    b.3) constructing an output signal at its output;
  c) an adder for generating an error signal being the difference between the signals at the output of the Linear Equalizer and the output of the FIR block; and
  d) a tap adaptation block for minimizing the error signal, such that the input to the nonlinear equalizer includes only taps which are covered by the nonlinear equalizer.

The system may be adapted to equalize received signals with high order modulations, including:
PAM-2;
PAM-4;
PAM-8;
PAM-16;
Optical Dual Binary (ODB) modulation;
Quadrature Phase Shift Keying (QPSK);
QAM-8;
QAM-16.

The system may be also adapted to perform digital equalization of data channels in data networks, including:
data center intra-connection;
data center interconnection;
metropolitan point-to-point connections;
metropolitan Wavelength-Division Multiplexing (WDM).

The present invention is also directed to a method for digitally equalizing a data channel with heavily ISI-induced signals received after passing a data communication channel, comprising:
  a) sampling a received signal and converting it to a digital form;
  b) pre-processing the received signal by a Linear Equalizer, which is adapted to:
    b.1) pre-process a first group consisting of echoes/channel taps of the induced ISI, which are not equalized by the nonlinear equalizer, by eliminating the echoes/channel taps of the first group;
    b.2) pre-process a second group consisting of the combination of the entire echoes/channel taps of the induced ISI, by eliminating the echoes/channel taps of the second group; and
  d) receiving the signals preprocessed by the Linear Equalizer by a nonlinear equalizer; and
  e) compensating for the entire ISI induced by the channel by further processing, by the nonlinear equalizer, the preprocessed signals and eliminating the echoes/channel taps of the induced ISI to be equalized by the nonlinear equalizer.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The present invention suggests a digital equalization mechanism, which is combined with a Maximum Likelihood Sequence Estimator (MLSE) in digital communication links. The proposed equalization mechanism includes a receiver, which uses a combination of an LE and a Reduced Complexity MLSE (RC-MLSE) to implement a receiver with low implementation complexity and lower noise enhancement. The advantage is that an RC-MLSE requires less computations and less power and is more simple to implement than a regular MLSE.

The Relation Between Reduced Bandwidth and ISI

Generally, channels with reduced bandwidth introduce ISI. If the transmitted signal is given by:

$$y(t) = \Sigma_k a_k \cdot \delta(t - k \cdot T_{sym}) \quad [\text{Eq. 1}]$$

where
$a_k$—The transmitted symbol
k—The symbol index
$\delta$—The Dirac delta-function
t—The continuous time
$T_{sym}$—The baud interval (Sec)

Then the received signal (before sampling) could be written as:

$$r(t) = y(t) * h(t) + w(t) \quad [\text{Eq. 2}]$$

w(t)—The additive noise
h(t)—The overall impulse response from transmitter (before DAC) to receiver (after ADC)

$$r(t) = \Sigma_k a_k \cdot h(t - k \cdot T_{sym}) + w(t) \quad [\text{Eq. 8}]$$

Assuming perfect timing reconstruction, the sampling instances will be:

$$t = n \cdot T_{sym}$$

Under these conditions, the sampled version of the received signal could be written as:

$$r_n = r(t = n \cdot T_{sym}) \quad [\text{Eq. 4}]$$

$$r_n = \sum_k a_k \cdot h(n \cdot T_{sym} - k \cdot T_{sym}) + w(n \cdot T_{sym})$$

$$r_n = \sum_k a_k \cdot h((n - k) \cdot T_{sym}) + w(n \cdot T_{sym})$$

$$r_n = a_n \cdot h(0) + \sum_{k \neq n} a_k \cdot h((n - k) \cdot T_{sym}) + w_n$$

where,
$a_n \cdot h(0)$ is the desired part of the signal
$\Sigma_{k \neq n} a_k \cdot h((n-k) \cdot T_{sym})$ is the inter symbol interference (ISI) term
$w_n$ is the additive noise.

Figure 1:
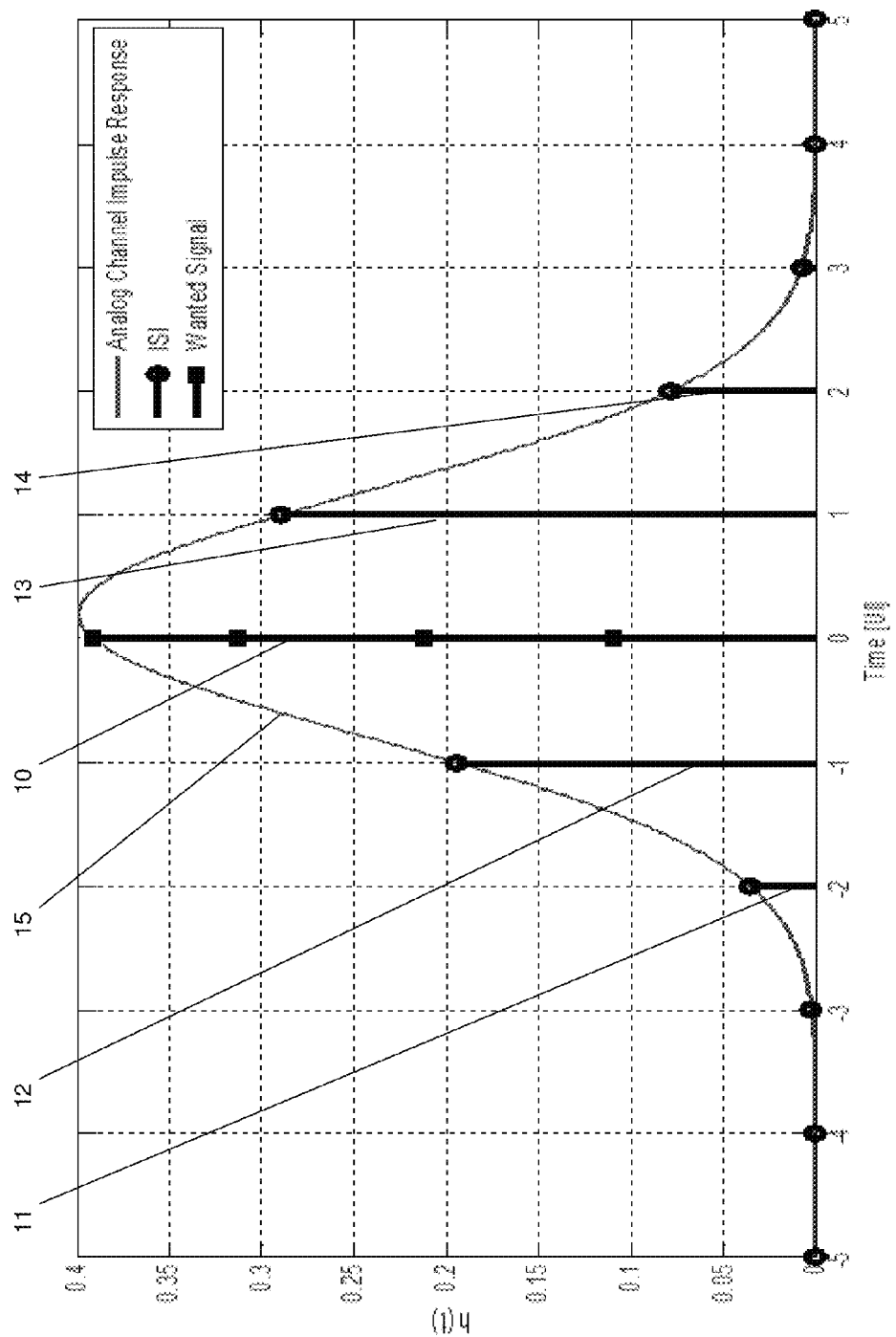
FIG. 1 (prior art) illustrates an example of the impulse response of a typical data channel with reduced bandwidth.

FIG. 1 shows an example of the response of a typical reduced bandwidth channel. In this case, the channel includes four effective echoes (unwanted signals) 11-14 (in this example, for Unit Intervals (UIs) =−2, −1, 1, 2, where the UI is the symbol duration time), while the rest are zero and therefore, do not add anything to the received signal. The envelop 15 represents the analog channel impulse response.

A Linear Equalizer based on the Minimum Mean Squared Error (MMSE) criteria tries to minimize the error caused by both the residual ISI and by the (enhanced) noise. On the other hand, an MLSE decoder does not try to invert the channel (i.e., to zero the ISI) but rather, it uses the echoes as a wanted signal for decoding the transmitted symbol sequence (the echoes are 'wanted signals' for consecutive symbols). An MLSE decoder that uses the echoes as wanted signals is required to implement decoding functionality which is proportional to:

$$C \propto M^{(N_{ISI}+1)} \quad [\text{Eq. 5}]$$

where M is the symbol modulation order (i.e., for PAM-4, M=4 etc.) and $N_{ISI}$ is the number of echoes used for sequence decoding.

If an RC-MLSE decoder implementation uses $N_{ISI}$ which is smaller than the channel unwanted ISI (to save implementation complexity), then the residual ISI will reduce the performance of the decoding algorithm.

For the example of FIG. 1, the channel ISI is represented by 5 echoes (including the wanted signal 10 and un-wanted ISI 11-14). If the RC-MLSE decoder implementation uses only $N_{ISI}$=2, then only two unwanted echoes and the wanted echo will be used in the RC-MLSE decoding algorithm, while the other (remaining) two unwanted echo's will reduce the decoding performance since they are not taken into the decoding considerations.

Figure 2:
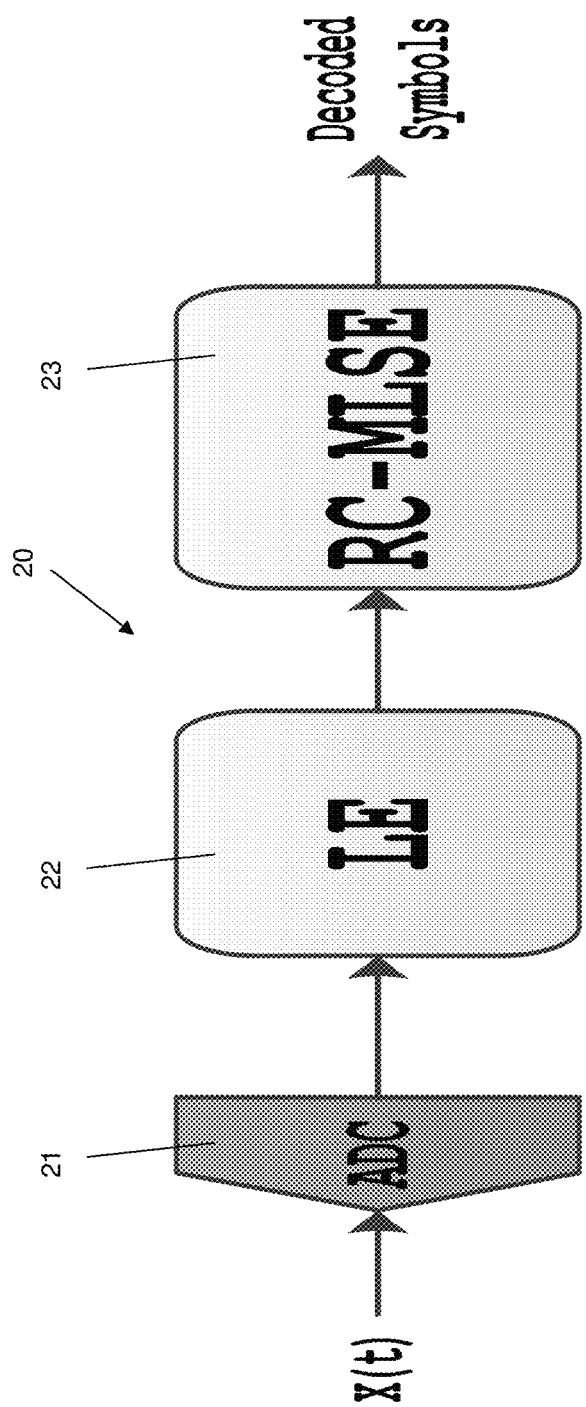
FIG. 2 illustrates a block diagram of the equalization system proposed by the present invention.

FIG. 2 illustrates a block diagram of the equalization system proposed by the present invention, in which the receiver 20 includes an ADC 21 for sampling the received signal x(t) and a combination of an LE 23, followed by a Reduced Complexity MLSE (RC-MLSE) 23 to implement the receiver 20 with low complexity and lower noise enhancement.

The decoding process is based on the following combined processing: At the first step, the echoes/channel taps of the induced ISI are reduced by using a Linear Equalizer 22, in order not to be covered by the reduced complexity MLSE (RC-MLSE) 23. At the next step, the signal at the linear equalizer's output is decoded (using standard decoding) by the RC-MLSE 23. This decoding process is described in FIG. 3 (in time domain).

Figure 3:
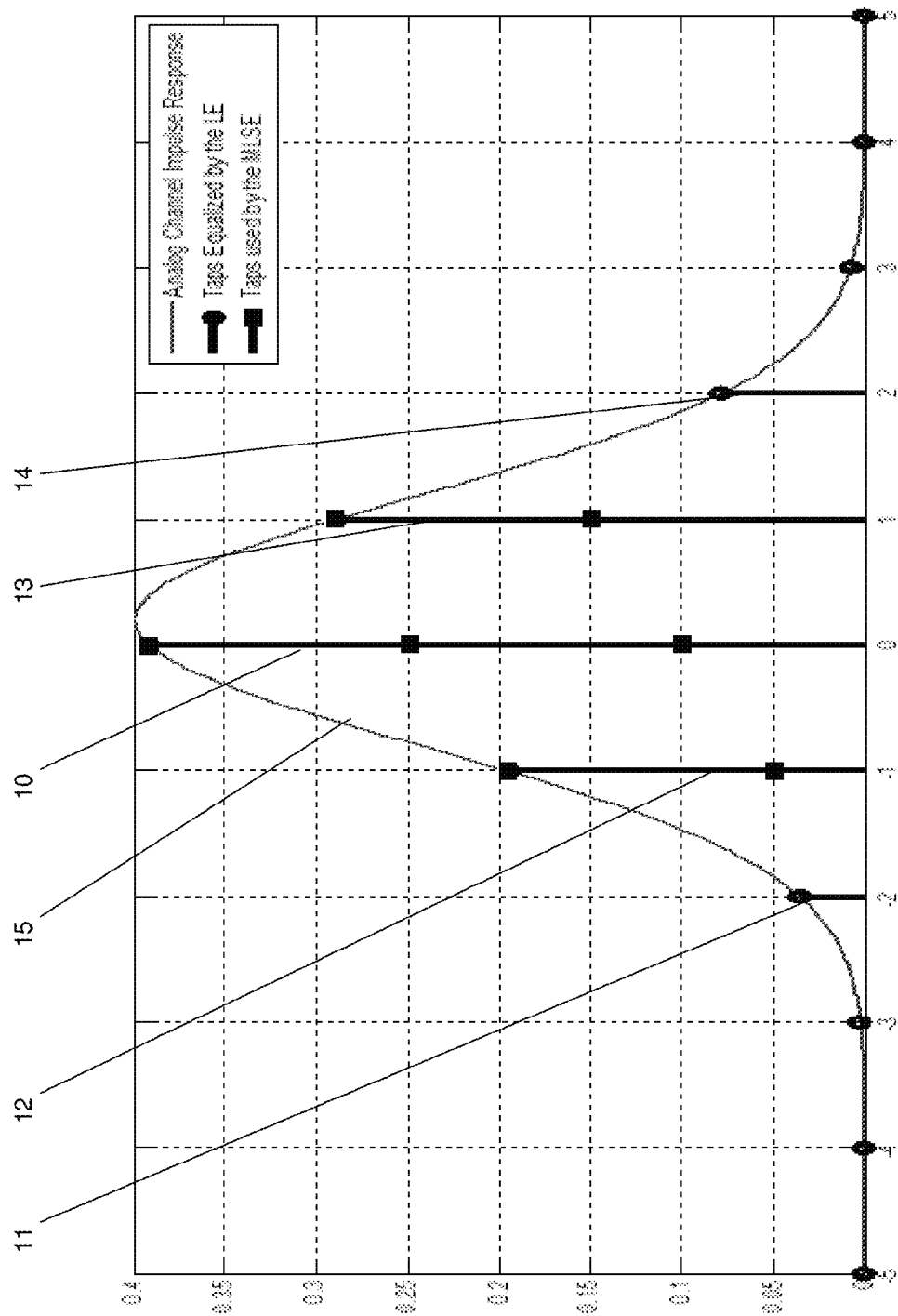
FIG. 3 illustrates the impulse response of a data channel with reduced bandwidth after performing a decoding process, based on a combined processing using a Linear Equalizer and a reduced complexity MLSE (RC-MLSE), as proposed by the present invention.

In the example of FIG. 3, it is assumed that the number of echoes handled by the RC-MLSE is $N_{ISI}$=2 (the wanted signal 10 and its two neighboring echoes 12-13). The envelop 15 represents the analog channel impulse response. Taps (echoes) 11 and 14 represent the taps which are equalized by the linear equalizer 22. Taps echoes) 10, 12 and 13 represent the ($N_{ISI}$+1) taps which are used by the RC-MLSE 23 to decode the symbol sequence. The Linear Equalizer 22 is used to preprocess the less effective taps (echoes) 11 and 14 by eliminating them and redistributing their energy among the remaining taps 10, 12 and 13 (which are the most substantial), to be processed by the RC-MLSE 23. Despite the fact that the channel is non-linear, the LE 22 assumes linearity of the channel and therefore, performs only linear operations which are less complex (that the operations of the RC-MLSE 23 which are nonlinear). The redistribution scheme is based on the number of taps that RC-MLSE 23 will be required to further process. For example, if the level of the less effective taps (echoes) is below the noise level, the LE 23 will be adapted to totally eliminate them (without redistributing their energy among the remaining taps), such that only taps with energy level which is above the noise level will be redistributed. By doing so, the LE 22 effectively modifies (reshapes) the impulse response of the channel, to include only three taps (10, 12 and 13), thereby "shortening" the channel and saving from the processing effort that will be required from the RC-MLSE 23.

According to the present invention, the filter taps of Linear Equalizer are continuously adapted by constructing an error signal for the LE tap adaptation.

Figure 4:
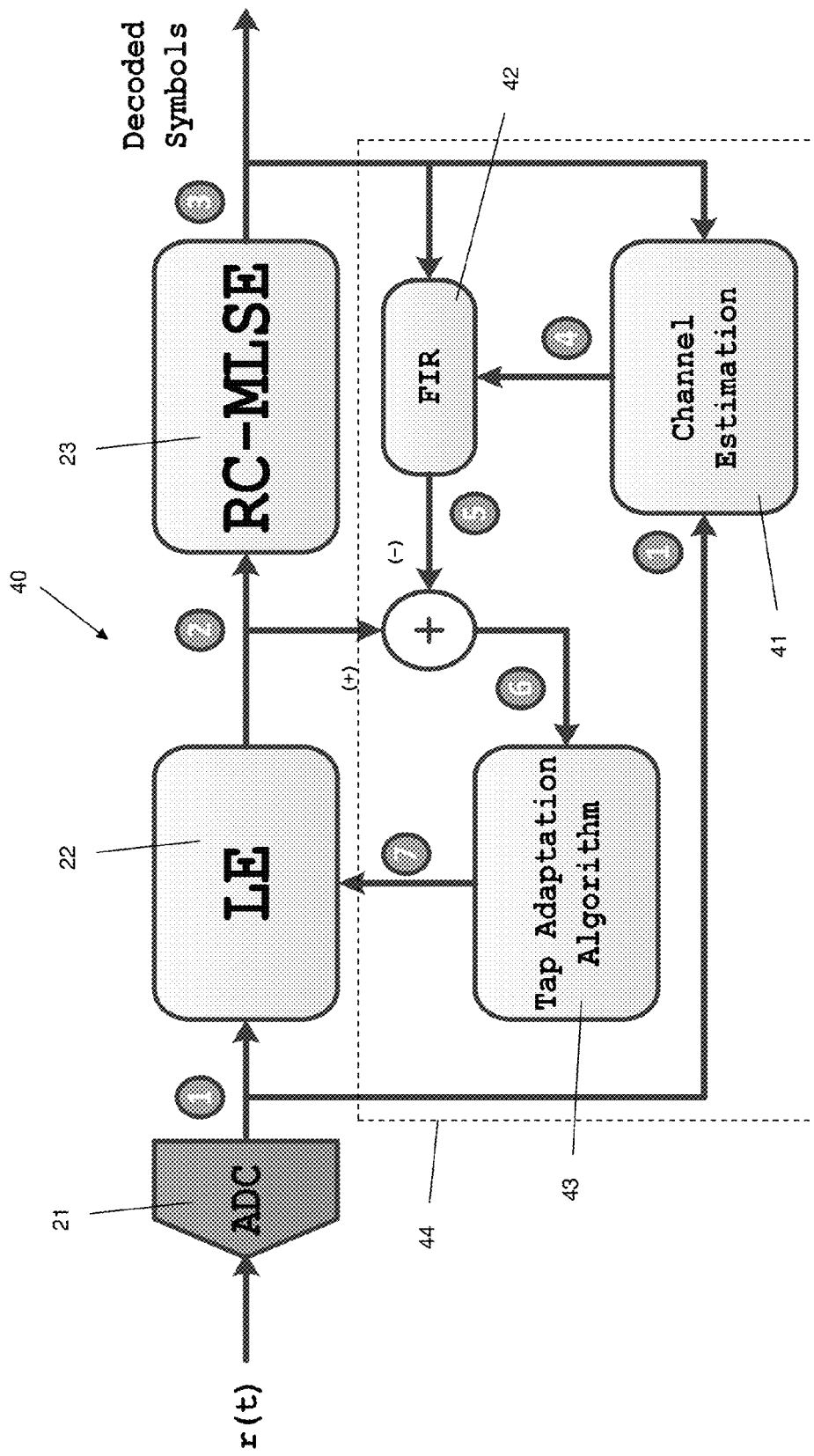
FIG. 4 is a block diagram of the equalization system of FIG. 2, with continuous adaptation capability of filter taps of the Linear Equalizer, according to the present invention.

FIG. 4 is a block diagram of the equalization system (of FIG. 2) with continuous adaptation capability of filter taps of Linear Equalizer 22 using a linear feedback circuitry 44, as proposed by the present invention.

The received signal $r_n$ an after sampling (at point 1) could be written as:

$$r_n = \Sigma_k a_k \cdot h_{(n-k)} + w_n \quad [\text{Eq. 6}]$$

The channel estimation block 41 receives the received signal $r_n$ (point 1) at one input and the decoded symbols from the output of the RC-MLSE 23 (point 3) at the other input, to estimate the channel's impulse response signal h[n].

The channel estimation block 41 provides to the FIR block 42 a signal (point 4) which includes the channel taps that are covered by the RC-MLSE 23: $h_k (k \in \text{MLSE Taps})$. The FIR block 42 also receives the decoded symbols from the output of the RC-MLSE 23 (point 3) and from the output of the channel estimation block 41 (point 4), constructs the signal at the output of the FIR block 42 (point 5) which is given by:

$$x5_n = \rho_{k \in MLSETaps} a_k \cdot h_{(n-k)} \quad [\text{Eq. 7}]$$

The signal at point 6, which is the difference between the signals at the output of Linear Equalizer 22 (point 2) and the output of the FIR block 42 (point 5), represents the error signal $x6_n$ (at point 6):

$$x6_n = x2_n - x5_n \quad [\text{Eq. 8}]$$

The tap adaptation block 43 receives the error signal at point 6 and minimizes it. When this will happen (while neglecting the noise and assuming the minimal value is zero), the signal at point 2 will be equal to the signal at point 5 so the signal at point 2 could be written as:

$$x2_n = \Sigma_{k \in MLSETaps} a_k \cdot h_{(n-k)} + \tilde{w}_n \quad [\text{Eq. 9}]$$

In such a case (steady state), the input to the RC-MLSE 23 includes only taps which are covered by the RC-MLSE 23.

In practice, FIR block 42 is fed by the channel estimation block 41, which represents the linear model (assumption) of the channel. Therefore, FIR block 42 will have a reshaped impulse response, which generates the error signal (at point 6), according to which the tap adaptation block 43 updates the taps of the LE 22.

Figure 5:
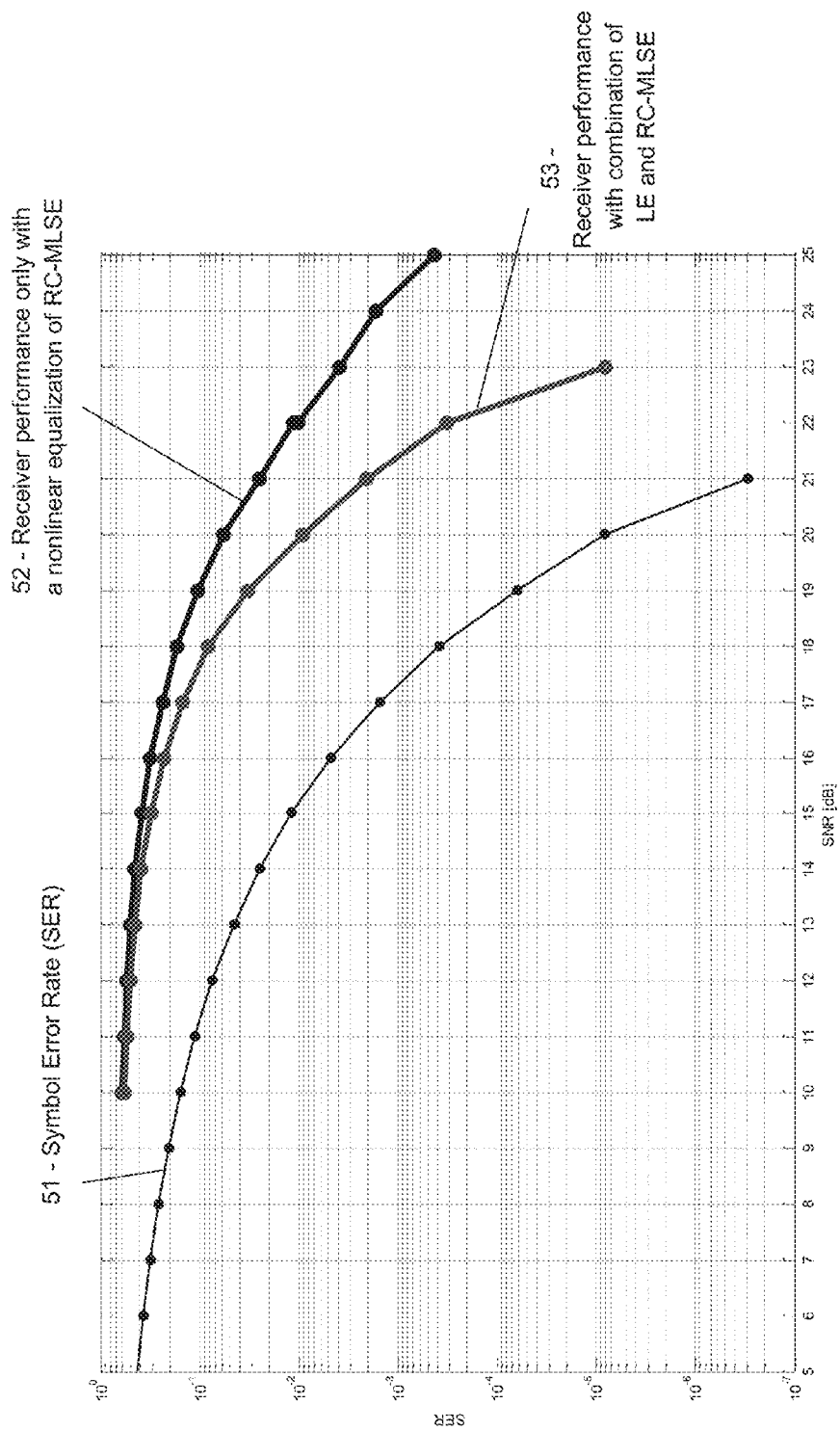
FIG. 5 illustrates comparison results of the Symbol Error Rate (SER) between a receiver scheme which includes an RC-MLSE receiver only and a receiver scheme which includes a combination of an LE and an RC-MLSE.

The implementation of the linear feedback circuitry 44 of FIG. 4 actually uses only linear (and relatively simple) operations, in order to simplify the implementation FIG. 5 illustrates a comparison between a receiver scheme which includes an RC-MLSE receiver 23 only and a receiver scheme which includes a combination of an LE 22 and an RC-MLSE 23.

In this example, the channel impulse response was:
h=[0.00011351  0.021874  0.23321  0.46527  0.25063  0.030095  −0.0014694];

Graph 51 represents the Symbol Error Rate (SER) for a hard slicer decoder over an Additive white Gaussian noise (AWGN) channel with no ISI. Graph 52 represents receiver performance over the ISI channel, which uses only a non-linear equalization of the RC-MLSE 23 ($N_{ISI}=2$). Graph 53 represents the receiver performance over the ISI channel, using the combination of an LE 22 and an RC-MLSE 23. It can be seen that the SER obtained by using the proposed combination of an LE 22 for linear preprocessing and an RC-MLSE 23 for nonlinear processing provides a reasonable SER, with much less implementation complexity.

The above examples and description have of course been provided only for the purpose of illustration, and are not intended to limit the invention in any way. As will be appreciated by the skilled person, the invention can be carried out in a great variety of ways, employing more than one technique from those described above, other than used in the description, all without exceeding the scope of the invention.

The invention claimed is:

1. A system for digitally equalizing a data communication channel with heavily Inter Symbol Interference (ISI)-induced signals received after passing said data communication channel using a combination of a linear equalizer and a nonlinear equalizer, the system comprising:
   a) an Analog to Digital Converter (ADC), for sampling a received signal and converting said received signal to a digital form;
   b) a Linear Equalizer for pre-processing said received signal, said Linear Equalizer is adapted to modify an impulse response of said data communication channel by:
   pre-process some channel taps of the induced Inter Symbol Interference (ISI) signals, which are less effective taps but having a level above a noise level of said data communication channel, and eliminate said less effective channel taps redistributing energy of said less effective channel taps among the remaining channel taps and totally eliminate said less effective taps having a level below the noise level of said data communication channel, without redistributing their energy among the remaining channel taps;
   c) a nonlinear equalizer for receiving the ISI induced signals preprocessed by said Linear Equalizer and for further processing said preprocessed signals and eliminating the channel taps of the induced Inter Symbol Interference (ISI) signals to be equalized by said nonlinear equalizer; and
   d) a linear feedback circuitry for continuously adapting filter taps of said Linear Equalizer by constructing an error signal according to a relation between i) samples of the signal received by said data communication channel, ii) an output of the nonlinear equalizer, and iii) an output of the Linear Equalizer, such that an input to said nonlinear equalizer includes only taps that are covered by said nonlinear equalizer, thereby compensating for the entire Inter Symbol Interference signals induced by said channel.

2. The system according to claim 1, wherein the linear feedback circuitry comprises:

a) a channel estimation block for receiving the received signal at one input and decoded symbols from an output of the nonlinear equalizer at another input, to estimate a channel's impulse response signal;

a Finite Impulse Response (FIR) block for:
- a.1) receiving a signal which includes the channel taps that are covered by said nonlinear equalizer, from said channel estimation block;
- a.2) receiving the decoded symbols from the output of said nonlinear equalizer;
- a.3) constructing an output signal at its output;

b) an adder for generating the error signal being a difference between the ISI induced signals at an output of said Linear Equalizer and the output of said FIR block; and c) a tap adaptation block for minimizing said error signal, such that an input to said nonlinear equalizer includes only taps which are covered by said nonlinear equalizer.

3. The system according to claim 1, in which the nonlinear equalizer is a Reduced Complexity Maximum Likelihood Sequence Estimation (RC-MLSE).

4. The system according to claim 1, being adapted to equalize received signals with high order modulations, including:
Pulse Amplitude Modulation (PAM)-2;
PAM-4;
PAM-8;
PAM-16;
Optical Dual Binary (ODB) modulation;
Quadrature Phase Shift Keying (QPSK);
Quadrature Amplitude Modulation (QAM)-8; and
QAM-16.

5. The system according to claim 1, being adapted to perform digital equalization of data channels in data networks, including:
data center intra-connection;
data center interconnection;
metropolitan point-to-point connection; and
metropolitan Wavelength-Division Multiplexing (WDM).

6. A method for digitally equalizing a data communication channel with heavily Inter Symbol Interference (ISI)-induced signals received after passing a data communication channel, the method comprising:

a) sampling a received signal and converting said received signal to a digital form;

b) modifying an impulse response of said data communication channel by pre-processing, using a Linear Equalizer, some channel taps of the induced Inter Symbol Interference (ISI) signals, which are less effective taps but having a level above a noise level of said data communication channel;

c) eliminate, by using a Linear Equalizer, said less effective channel taps by redistributing energy of said less effective channel taps among the remaining channel taps;

d) totally eliminate said less effective taps having a level below the noise level of said data communication channel, without redistributing their energy among the remaining channel taps;

e) receiving signals preprocessed by said Linear Equalizer by a nonlinear equalizer;

f) continuously adapting, by a linear feedback circuitry, filter taps of the Linear Equalizer according to a relation between i) samples of the signal received by said data communication channel, ii) an output of the nonlinear equalizer, and iii) an output of the Linear Equalizer, such that an input to said nonlinear equalizer includes only taps that are covered by said nonlinear equalizer; and g) compensating for the entire Inter Symbol Interference (ISI) induced by said channel by further processing, by said nonlinear equalizer, said preprocessed signals and eliminating the channel taps of the induced Inter Symbol Interference (ISI) signals to be equalized by said nonlinear equalizer.

\* \* \* \* \*